Patented May 18, 1926.

1,585,371

UNITED STATES PATENT OFFICE.

ERNEST M. BROGDEN, OF WINTER HAVEN, FLORIDA, ASSIGNOR TO BROGDEX COMPANY, OF WINTER HAVEN, FLORIDA, A CORPORATION OF FLORIDA.

COMPOSITION FOR TREATING FRUIT AND THE LIKE.

No Drawing. Application filed January 29, 1923. Serial No. 615,741.

This invention relates to compositions for treating fruit and the like; and it relates more particularly to compositions comprising a normally solid protective material, especially a waxy material of substantially neutral character, such as paraffine wax, intimately associated in suitably fluent mixture with an oily vehicle that is also substantially neutral or inert, the mixture being adapted, when properly applied to fresh fruit or the like, to provide the same with a very thin film-like coating effective to suitably seal the surface thereof in such manner as to provide protection against infection from external sources, to prevent withering or shrinking and loss of flavor for prolonged periods of time, and in general to maintain the fruit or like article sound, plump and fresh.

For the sake of convenience, the term "fruit" is herein used in a broad sense to include both fruits proper and also vegetables, in so far as they can be treated to advantage with the novel compositions of the invention.

In the course of extensive practical work in the protective or preservative treatment of fresh fruit by coating the same with a mixture of paraffin and a liquid vehicle or solvent therefor, I have found it possible to improve materially the mixture or composition with respect to its effect upon the keeping qualities of the fruit and upon the acceptability of the fruit to the trade from the standpoint of appearance, as well as in other important respects, as will hereinafter appear. Whereas a composition in which the entire solvent vehicle is of relatively high volatility, such as gasoline, has heretofore been considered especially advantageous and has in fact been employed to a considerable extent, I have now found that more uniformly dependable results can be had and other practical advantages attained by using a vehicle consisting wholly or in part of a suitable liquid medium characterized by substantially lower volatility than gasoline, provided the composition is otherwise properly constituted and care is taken to ensure that the protective or preservative coating remaining on the fruit as a result of the treatment is of the requisite extreme thinness. It is of importance also that whatever vehicle is employed shall be as nearly netural and inert as possible in respect to its behavior toward fruit under the conditions of its employment for the purposes stated.

Among various oils less volatile than gasoline and otherwise suitable that I have found satisfactory for use in the practice of my invention, refined mineral oils derived from petroleum, and particularly those that are free from color, taste and odor, or practically so, are usually best adapted for the purposes here in view. Of such oils, which are produced from both parafine base and naphthene base crudes, those known commercially as "white oils", some of which are used for medicinal purposes, possess characteristics that render them especially advantageous as components of preservative coating compositions of the character here in question; but it is to be understood that the broad invention is not limited to the employment of such oils, these being referred to here only by way of an illustrative example representing a particularly desirable type of oily vehicle well adapted for the purposes in view. A good grade of what is known commercially as "paraffine oil" is another example of an oil that can sometimes be employed in my novel composition as an oily vehicle.

In some of the broader aspects of the invention, the oily vehicle employed in the novel composition may be characterized generally as an oil included within the range defined by lubricating oils on the one hand and low-boiling kerosenes on the other, as respective limits, and that is without substantial deteriorating or destructive action on fruit. Oils included within said range are all substantially non-volatile at ordinary room temperatures and most of them have flash points well above those prevailing at any stage in the preservative treatment of fruit.

As a result of extensive experimentation in preservative treatment of fresh fruits of various kinds, I have found that the matter of viscosity of the oily vehicle employed is one that in many cases has a very important influence on the character and consequent effectiveness of the protective or preservative coating film produced on the fruit by the methods of application now in use. The viscosity factor manifests itself in at least two ways: first, it materially affects the thickness of the protective film produced on the fruit by the rubbing action of the polisher brushes or other rubbing means employed; and second, it determines in some degree the extent to which the solvent penetrates or is absorbed by the tissues of the fruit skin or rind, thus also necessarily affecting the consistency and other properties of the residual protective film proper. Thus, where a vehicle of too high viscosity is used, even though the waxy composition may have the appearance of being easily spreadable, the brushes may not rub it out on the fruit surface to the thinness requisite for best results. Furthermore such an oil is apt not to penetrate or be absorbed by the fruit rind or skin to the extent normally desirable in the case of citrus fruits especially. On the other hand certain thin-skinned and sensitive grades of fruit may be damaged rather than helped by application thereto of a composition comprising an oil of too low viscosity and correspondingly high penetrative properties. Accordingly the factor of viscosity is a controlling consideration in some, although not all, aspects of the present invention.

The employment of suitable vegetable or animal oils is not excluded but is more expensive; and furthermore mineral oils are generally preferable because of their normally greater chemical stability and inertness under the conditions of use herein contemplated. Nor is the presence in the composition of a more volatile solvent, such as gasoline or petrolic ether, for example, if in association with a less volatile solvent of the general class above referred to, to be understood as outside the scope of the invention in its broader aspects. The important consideration is that there shall be present in the mixture enough of a solvent less volatile than gasoline to exercise a substantial influence upon the character of the composition, distinguishing it from compositions in which only a relatively volatile solvent is employed.

It is of course important to avoid using oils or other ingredients in the mixture that have a specifically harmful action on fruit. Oils that are undesirable to employ in the novel composition of the invention in its best embodiments may result, for example, from excessive heat treatment and consequent drastic cracking during the refining or distillation of petroleum and its products, a condition which is often evidenced by discoloration; or they may be oils that show substantial mineral acidity as a result of improper treatment after distillation. Such oils should not be used in the treatment of highly sensitive fruit. Generally speaking, the presence of heavy lubricating ends in the oily vehicle is not desirable.

The waxy material included in the novel composition, as well as the oily vehicle, should be practically inert chemically, without harmful action upon fruit or upon the human digestive tract, and most desirably should be substantially free of color, taste and odor. Ordinarily a mineral wax best answers the requirements. Paraffine wax, obtainable commercially in several grades varying in purity and melting point, is especially to be recommended. A highly refined paraffine that is of excellent purity and has a reasonably low melting point, about 118° F,. is commercially available and has given particularly good results in practice; and, unless otherwise specified, its use will be understood wherever paraffine is referred to hereinafter. Higher melting and less pure grades of paraffine can be used but are sometimes not so completely satisfactory.

In order to afford a still fuller understanding of the principles of the invention, specific illustrative examples of compositions embodying the same will now be given.

Example 1.

High grade commercial paraffine wax having a melting point of about 118° F. is melted and heated to a temperature approximating 135°–140° F. and is intimately mixed or blended with a white mineral oil, which may also be warmed somewhat, in the proportion of 1 volume of the molten paraffine to 2 volumes of the white oil. The mixing may be conveniently effected by running properly proportioned streams of the paraffine and oil simultaneously into a suitable container equipped with a stirring or agitating device; the mixture, which is a clear liquid at first, being thoroughly stirred until it cools to room temperature. As it cools, the mixture thickens, turning whitish and more or less opaque, due to partial congelation of the blend at the room temperature in question. If properly mixed, and especially if the mixing is effected in a high-speed agitator or emulsifier, the final product is a smooth, homogeneous, substantially white magma-like mass of somewhat thick but fairly fluent consistency at ordinary room temperatures even as low as 60° to 65° F. or thereabouts. The general method of preparation described is adapted for preparing not only the composition of this particular example, but also of those hereinafter set forth.

In a typical instance the oil used in the foregoing specific example may desirably be a low-viscosity white mineral oil, practically odorless, colorless and tasteless, having a specific gravity of between about .830 and .870 and a relatively narrow distillation range, all of which characteristics render it especially suitable for use as an oily vehicle in the composition described. A typical specimen of such a white oil shows the following characteristics when tested by standard methods: specific gravity 0.840 (about 38° Bé.), viscosity at 100° F. 70 to 73 sec. Saybolt, flash point 340° to 350° F., distillation range 600° to 745° F. A white oil of this general type having a specific gravity of between about .830 to .850 and a viscosity within the approximate range of 50 to 100 seconds Saybolt (at 100° F.) is regarded as a particularly desirable vehicle for general purposes.

The composition described, comprising about 1 part paraffine and 2 parts white oil in a typical instance, is one offering important advantages for preservative treatment of globular fruits generally. Properly applied to such fruit, notably apples and pears, and also citrus fruit including oranges, grapefruit, lemons, etc., this composition provides the fruit with an efficient protective film coating of thoroughly satisfactory character and of such extreme thinness as hardly to be perceptible. Proper application can be effected by a thorough rubbing operation which is most conveniently effected by means of polisher apparatus of a generally well known type having long revolving cylindrical brush rolls arranged in parallel and cooperating in pairs to provide inclined runways down which the fruit may travel while being subjected to the rubbing action of the horsehair brush bristles. The final stage of the rubbing is desirably carried on in an environment heated to around 130° to 140° F. The relatively non-volatile neutral oil in the comparatively minute quantity of composition remaining on each fruit after treatment is apparently absorbed in part by the skin or rind of the fruit to such an extent that the treated fruit does not have an unduly "slick" feel, especially after the lapse of a few days. At the same time, the undesirable deteriorating effects on fruit sometimes produced under certain conditions when a volatile solvent such as gasoline constitutes the only vehicle for the wax, are notably absent. Moreover, the film-like waxy coating is less brittle and more perfectly adherent to the fruit than where the vehicle is wholly of the volatile type. Another good point of this and all other forms of the novel composition is that it does not cake or clog the polisher brushes with paraffine anywhere near as much as did former compositions comprising only a volatile solvent vehicle for the paraffine. With the formerly used paraffine-gasoline composition, the comparatively rapid evaporation of the solvent resulted in the horsehair bristles of the polisher brushes eventually becoming encased in fairly solid paraffine, which greatly reduced the efficiency of the brushes and necessitated more or less frequent shut-downs to clean them. Actual practice has demonstrated other advantages of the novel composition unnecessary to enumerate here.

While, as stated, the specific composition just described has characteristics peculiarly adapting it for the purposes in view, the relative proportions of the ingredients can be varied within certain limits without greatly altering said characteristics, and within still wider limits while still realizing important benefits of the invention. Thus, in operating at atmospheric temperatures around 50° to 65° F., a thinner mixture of the paraffine and white oil comprising about 30 per cent of paraffine is to be recommended; while, in very warm weather 35 to 40 per cent of paraffine can be used to advantage. In other cases, compositions comprising a white oil vehicle and containing as little as 5 or 10 to 20 per cent of paraffine, or as much as 65 to 75 per cent of paraffine, find useful application; but in general these are not so desirable as the compositions in which the proportion of paraffine is between 25 and 50 per cent.

*Example 2.*

White oils that are heavier and of higher viscosity than the typical oil whose identifying characteristics were given under example 1, but which are also free of very heavy ends, may constitute the whole or any suitable part of the oily vehicle; but in that case a smaller proportion of paraffine is usually required to give the composition a given consistency. For the treatment of certain fruits, notably apples and pears, this is not objectionable and even has some advantages. Identifying characteristics of two typical specimens of such heavier white oils that are commercially available and that have proven satisfactory are as follows:

|  | #1 | #2 (Medicinal) |
|---|---|---|
| Baumé grav | 28.5 | 28.0 |
| Specific grav | .883 | .886 |
| Viscosity at 100° F | 121 sec. Saybolt. | 204 sec. Saybolt. |

Specimen #1 has a very faint yellow tint, a faint odor and is practically tasteless; while the medicinal oil, specimen #2, is water white, odorless and tasteless. For general purposes a white oil having a viscosity not materially exceeding 150 seconds is preferable, although a viscosity of as high as 300 seconds is sometimes suitable. It is seldom necessary to exceed a specific gravity of .890 or .900.

Example 3.

In this case a substantially lighter but still comparatively non-volatile oil is used with a mineral wax such as paraffine. Highly desirable oils of this type may range, for example, from 42° to 44° Baumé (.811 to .820 specific gravity); but wider variations are permissible. Such an oil may have a distillation range of 360° to 486° F. in a typical instance, and a flash point of 149° F. Such an oil is practically a narrow-cut oil of the kerosene type, highly refined and substantially non-volatile below 150° F. It is substantially water white, practically neutral, and has only a very faint odor of kerosene. Its viscosity is very much lower than a "white oil" of the type employed in examples 1 and 2. Compositions comprising mixtures of such an oil with paraffine in various suitable proportions have given good results in practice for certain purposes. The proportion of paraffine may vary from as little as 10 or 20 per cent to as much as 80 or 90 per cent; but a range of from about 30 to 60 per cent of paraffine in the mixture is much the most satisfactory for treating citrus fruit. Other oils of the kerosene type may of course be used where proper refining methods have been used in their production.

Example 4.

By blending with paraffine a composite non-volatile oil solvent vehicle, comprising two or more white mineral oils of the types mentioned in examples 1 and 2, or comprising a white oil and a lighter non-volatile solvent such as that described under example 3, compositions are obtainable that are found superior for some purposes to those described in the preceding examples. The employment of a composite oily vehicle enables accurate adjustment of the viscosity and other properties of the composition to meet given conditions of use. Thus, a thoroughly emulsified mixture of equal parts by volume of paraffine, a white mineral oil, and a lighter mineral oil of the kerosene type, is found highly effective for preservatively coating and polishing citrus fruit at ordinary room temperatures; and a mixture that is even better under some circumstances results from similarly blending about 30 parts of paraffine with 20 parts of white oil and 50 parts of the lighter oil of the kerosene type. Still another mixture that works exceedingly well consists of 35 parts of the paraffine wax, 15 parts of white oil, and 50 parts of said lighter oil. These mixtures are especially satisfactory when the white oil employed is that described in example 1.

Example 5.

I have also found that the employment of non-volatile oil in a preservative composition of the general character here in question is distinctly advantageous even where the greater part of the oily vehicle is one, like gasoline or petrolic ether, that is relatively volatile at usual atmospheric temperatures. Here, as in the preceding examples, the non-volatile oil functions usefully in bettering the character and adherence of the waxy coating. If the composition is very thin and fluid, as it may be in the preservative treatment of certain fruits that occur in clusters or bunches, such as bananas and grapes, where rubbing the fruit is not feasible and dipping must be resorted to, the presence of even as little as 3 to 5 per cent of a white mineral oil in the mixture or solution of paraffine and volatile solvent is effective to prevent the paraffine from being deposited in crystals or similar particles on the surface of the fruit upon evaporation of the volatile solvent. Moreover, the character of the film-like residual coating of paraffine on the dipped fruit is favorably influenced by the presence of the non-volatile oil therein.

While certain harmless ingredients other than the waxy material and the oily solvent vehicle may be incorporated for particular purposes in the various forms of my novel composition hereinabove described, without departing from the invention in its broader aspects, such additional ingredients are not usually necessary and should in any case be employed with great caution in view of the remarkable sensitiveness of many fruits to various agents that are ordinarily classed as innocuous.

In some instances I have found it highly advantageous to incorporate in the preservative coating composition a germicidal agent effective to destroy or arrest the action of harmful micro-organisms, such as blue-mold spores and other fungoid organisms, that sometimes infest citrus and other fruits and that often ultimately destroy or seriously damage the fruit before it can be gotten into the hands of the consumer. In an important specific embodiment of my invention, therefore, a small percentage, ordinarily not to exceed 5 per cent, of a suitable germicidal agent such as formaldehyde may be incorporated and distributed throughout the composition by thorough mixing or emulsification. For example, the composition described under example 4 above, especially those comprising 30 to 35 parts of paraffine, 20 to 15 parts of white oil, and 50 parts of a lighter oil of the kerosene type, may be modified by introducing about 1 or 2 parts of formalin (40 per cent formaldehyde), the mixture being thoroughly blended, as by a high speed agitator or emulsifier, to distribute the germicidal agent uniformly throughout the composition. The slight amount of water thus introduced into the composition is found to be without appreciable effect in this environment, and the composition is therefore still substantially non-aqueous for all practical purposes, which is an important and highly desirable characteristic. In practice, this composition containing formaldehyde, as well as the other compositions hereinabove described, are most desirably applied to the fruit after the fruit has been cleansed without the use of any water whatever, either by dry brushing or with the aid of a non-aqueous medium such as an oil of some kind. The formaldehyde is found to effectively further the tendency of the composition to inhibit the development of any harmful micro-organisms that may remain on the fruit in spite of the careful preliminary waterless cleansing before mentioned. The percentage of the germicidal agent employed may of course be varied within reasonable limits, and the proportions of the waxy and oily ingredients relative to each other may naturally also be varied to suit practical conditions. Moreover, other germicidal agents may be used in place of formaldehyde, but at present formaldehyde is considered as most advantageous for various reasons among which may be mentioned the fact that its volatility ensures its substantially complete elimination from the fruit during shipment and before it reaches the consumer.

It has of course been proposed heretofore to treat fruit with germicidal agents, including formaldehyde, in conjunction with the usual methods of washing fruit with water. But these proposed methods are inherently objectionable because micro-organisms in general, and molds and other fungi in particular, thrive in a moist environment and accordingly the methods heretofore proposed have never proved successful in practice. I believe it to be broadly novel to apply a fungicidal agent to the substantially dry surface of fruit in conjunction with an oily or waxy vehicle that is substantially non-aqueous.

Generally speaking the various embodiments of the novel composition hereinabove described are adapted more particularly for the preservative treatment of fruit and this use has therefore been emphasized in the foregoing description; but it is not intended thereby to restrict the employment of the composition to that field only.

This application contains matter disclosed in prior co-pending applications of mine as follows: Serial No. 542,141, filed March 8, 1922; Serial No. 579,052, filed August 1, 1922; Serial No. 590,979, filed September 27, 1922; Serial No. 602,240, filed November 20, 1922.

What I claim is:

1. As a new article of manufacture a composition useful especially for preservatively coating fruit and the like which comprises paraffine and a refined mineral oil vehicle less volatile than gasoline intimately commingled therewith to give a homogeneous mixture of spreadable consistency at ordinary room temperatures, said mineral oil vehicle having a viscosity of between 50 and 300 seconds Saybolt at 100° F.

2. As a new article of manufacture, a composition useful especially for preservatively coating fruit and the like comprising paraffine intimately commingled with white mineral oil whose specific gravity is within the approximate range of .830 to .900 and whose viscosity exceeds 50 seconds but does not substantially exceed about 150 seconds Saybolt at 100° F.

3. As a new article of manufacture, a composition useful especially for preservatively coating fruit and the like comprising paraffine intimately commingled with white mineral oil whose specific gravity is between about .830 and .850 and whose viscosity is between about 50 and 100 seconds Saybolt at 100 F.

4. As a new article of manufacture, a composition useful especially for preservatively coating fruit and the like which comprises an intimate mixture of paraffine with a refined mineral oil vehicle substantially non-volatile at summer temperatures but free of heavy lubricating ends, the paraffine constituting between 5 and 75 per cent of the mixture.

5. As a new article of manufacture, a composition useful especially for preservatively coating fruit and the like which comprises an intimate mixture of paraffine with a refined mineral oil vehicle substantially non-volatile at summer temperatures but free of heavy lubricating ends, the paraffine constituting between 25 and 50 per cent of the mixture.

6. As a new article of manufacture, a composition useful especially for preservatively coating fruit and the like which comprises an intimate mixture of paraffine with a refined mineral oil vehicle substantially non-volatile at summer temperatures but free of heavy lubricating ends, the paraffine constituting between 30 and 40 per cent of the mixture.

7. As a new article of manufacture, a composition useful especially for preservatively coating fruit and the like comprising an intimate mixture of a waxy material, such as paraffine, with a white mineral oil, the proportion of said waxy material constituting from about 5 or 10 to 75 per cent of the mixture.

8. As a new article of manufacture, a composition useful especially for preservatively coating fruit and the like comprising an intimate mixture of a waxy material, such as paraffine with a white mineral oil, the proportion of said waxy material constituting from about 30 to 40 per cent of the mixture.

9. As a new article of manufacture, a composition useful especially for preservatively coating fruit and the like comprising paraffine blended with an oily vehicle substantially non-volatile at temperatures below 150° F. but substantially free of heavy lubricants, the mixture being whitish in appearance, sufficiently fluent to spread well at ordinary room temperatures, and substantially odorless and tasteless.

In testimony whereof I hereunto affix my signature.

ERNEST M. BROGDEN.